Oct. 14, 1941.             G. D. CESKA             2,258,674
                              REAMER
                       Filed March 5, 1940

WITNESSES.
A B Wallace.

INVENTOR.
George D. Ceska
BY Brown, Critchlow & Flick
His ATTORNEYS.

Patented Oct. 14, 1941

2,258,674

UNITED STATES PATENT OFFICE 2,258,674

REAMER

George D. Ceska, Dormont, Pa.

Application March 5, 1940, Serial No. 322,354

2 Claims. (Cl. 77—72)

This invention relates to reaming tools which are used to remove from the walls of punched holes the metal that has been torn or otherwise impaired by punching and to enlarge the punched holes to desired sizes, and which are also used for lining up, in superposed metal structures, such holes as to not match each other because of inaccuracies in the punching or drilling of them.

The two types of reamers now in use have certain objectionable characteristics. When the forward end of a reamer of one of these types is placed in a punched or otherwise formed hole, excessive manual effort is required to feed the reamer into the hole as the reaming action proceeds because the pitch of the cutting flutes resists such feed, and substantial manual effort is required to remove the reamer from the hole because its removal is resisted by the engagement of the cutting faces of the reamer with partially cut metal in the hole. In the use of the other type of reamers, namely those having straight cutting flutes, substantial manual effort is required to force the reamer into a hole although little or no effort is required to remove a reamer from a hole at the completion of a reaming operation.

Objects of the invention are to provide a reamer which requires no manual effort to force it into holes or to remove it from them after they have been reamed, and one which has a much longer life than those now in use.

Figure 1:
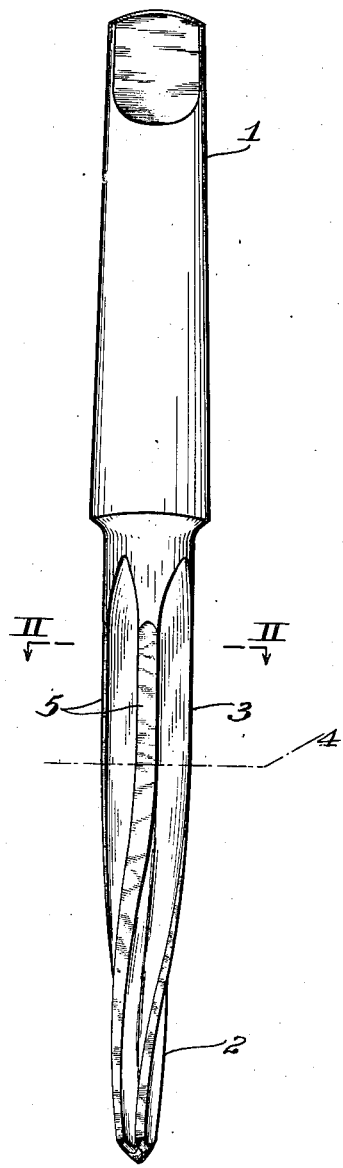
Figure 2:

The invention is illustrated in the accompanying drawing, of which Fig. 1 is an elevation of a reamer embodying the invention; Fig. 2 a cross-sectional view taken on the line II—II of Fig. 1; and Fig. 3 a view corresponding with Fig. 2 showing a modification of construction.

The reamer provided according to this invention has a cutting section which is conical at its forward portion, tapering outwardly from its point. Adjoining the rear end of the conical portion the body of the reamer is cylindrical and of the same diameter throughout as the rear end of the conical portion. The face of the reamer throughout its conical and cylindrical portions is provided with flutes or cutting edges which are continuous and uninterrupted, and which are helical on the conical portion and are straight and parallel to the longitudinal axis of the reamer on its cylindrical portion. The reamer thus characterized may be of any desired form. For example, it may be provided with any desired number of cutting edges or flutes, and on the conical portion the flutes may be either left or right-hand spirals. Preferably, the helical portion of the flutes is of a materially greater pitch, approaching or reaching straightness, throughout a small distance from the point of the reamer than throughout the main body of its conical portion.

In the illustrative embodiment of the invention, the reamer is shown as being provided at its rear end with an angular section 1 adapted to be received by the chuck or socket of a tool-actuating mechanism. The cutting section of the reamer consists of a conical portion 2 at its forward and a cylindrical portion 3 at its rear end, the juncture of the two being indicated by the broken line 4, Fig. 1. It will be observed that the cylindrical portion 3 is of the same diameter throughout as the rear end of the conical portion. Extending throughout the conical and cylindrical portions of the cutting section of the reamer, its face is provided with flutes 5, an outer edge of each of which forms a cutter. These flutes are helical throughout the conical portion of the reamer and are straight and parallel to the axis of the reamer throughout its cylindrical portion. As shown, the helical portion of the flutes for a short distance from the point of the reamer are preferably of greater pitch than they are throughout the main body of the conical portion. In fact, at the forward end of the reamer the flutes may be straight.

Figure 3:

As shown in Figs. 1 and 2, the reamer may be provided with four cutting flutes, although any desired number may be used. For example, the reamer shown in Fig. 3 is provided with five flutes.

In the use of the reamer provided according to this invention, its forward conical end is placed in a hole to be reamed. Rotation of the reamer on its longitudinal axis causes its helical flutes to grip and cut the metal from the wall of the hole and automatically to feed the reamer into the hole as the cutting proceeds. When the reamer has been drawn into the hole substantially to the plane of juncture between its conical and cylindrical portions, the hole will have been reamed substantially to desired size. A little manual effort is then required to so force the reamer into the hole that the wall of the hole is finished by the straight flutes on its cylindrical portion. Because the flutes which then engage the metal are straight and parallel to the longitudinal axis of the reamer, no effort is required to remove the reamer from the hole.

In addition to the advantages that have been explained, it has been found that the improved reamer, due to its simplicity of construction and design, is much easier to handle, and that it holds its cutting edges much longer than reamers now in use. The helical portions of the flutes so engage the metal that each cutter gets set at the start and steadily holds and shears the cuts until the hole is completely reamed. Furthermore, because the flutes are continuous and uninterrupted, they form an unbroken path in which the cuttings may readily flow, which aids greatly in preventing choking by obstructions in the path of the cuttings. The straight or substantially straight flutes at the forward end of the conical portion materially facilitate the initial stage of reaming unmatched holes in superposed metal structures.

According to the provisions of the patent statutes I have explained the principle and operation of my invention and have illustrated and described what I now consider to represent its best embodiment. However, I desire to have it understood that, within the scope of the appended claims, the invention may be practiced otherwise than as specifically illustrated and described.

I claim:

1. A reaming tool having a conical forward portion that tapers outwardly from the point of the tool and having a cylindrical rear portion adjoining and of the same diameter as the rear end of said forward portion, the face of the tool being provided with plain-faced cutting flutes which extend continuously on said conical and cylindrical portions, the flutes themselves being helical upon said conical portion to effect feeding of the tool to the work and being straight and parallel to the longitudinal axis of the tool on its cylindrical portion.

2. A reaming tool having a conical forward portion that tapers outwardly from the point of the tool and having a cylindrical rear portion adjoining and of the same diameter as the rear end of said forward portion, the face of the tool being provided with plain-faced cutting flutes which extend continuously on said conical and cylindrical portions, the flutes themselves being helical upon said conical portion to effect feeding of the tool to the work and being straight and parallel to the longitudinal axis of the tool on its cylindrical portion, and said helical portion of the flutes being of materially greater pitch at the forward end than throughout the main body of said conical portion.

GEORGE D. CESKA.